L. KULMA.
POWER TRANSMITTING MECHANISM.
APPLICATION FILED OCT. 11, 1917.

1,279,556.

Patented Sept. 24, 1918.
2 SHEETS—SHEET 1.

INVENTOR.
Louis Kulma.
By Wilhelm & Parker.
ATTORNEYS.

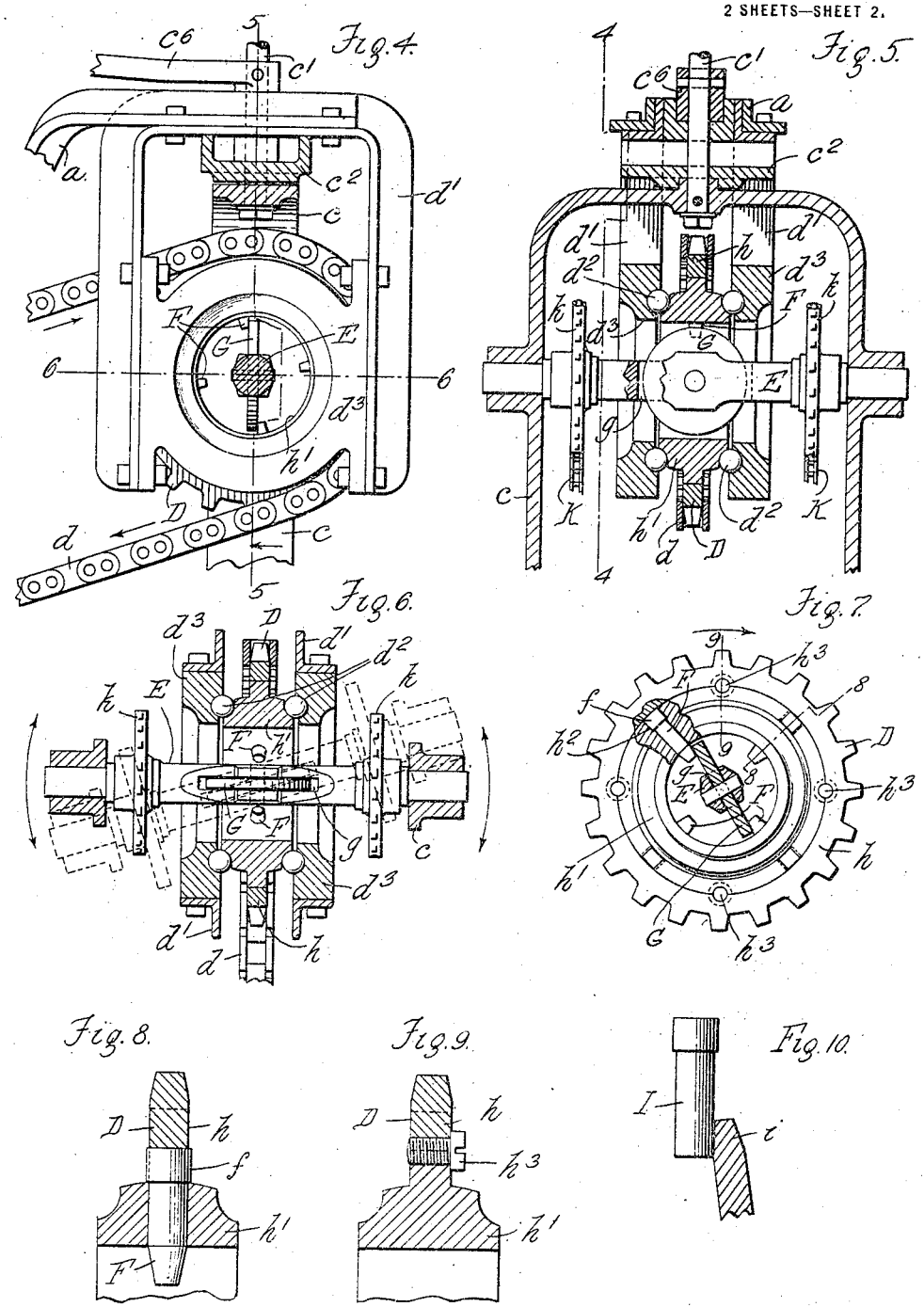

UNITED STATES PATENT OFFICE.

LOUIS KULMA, OF BUFFALO, NEW YORK.

POWER-TRANSMITTING MECHANISM.

1,279,556.  Specification of Letters Patent.  Patented Sept. 24, 1918.

Application filed October 11, 1917. Serial No. 196,054.

*To all whom it may concern:*

Be it known that I, LOUIS KULMA, a citizen of the United States, residing at Buffalo, in the county of Erie and State of New York, have invented a new and useful Improvement in Power-Transmitting Mechanisms, of which the following is a specification.

This invention relates to power transmitting mechanisms of the kind adapted for use on vehicles to transmit power to the ground wheel or wheels by which the vehicle is steered.

The objects of the invention are to produce a mechanism of this kind of improved construction in which the power is so transmitted to the wheel or wheels as not to interfere in any way with the steering of the vehicle; also to so construct a mechanism of this kind as to materially reduce the frictional losses in the mechanism; also to improve mechanism of this kind in other respects hereinafter specified.

In the accompanying drawings:

Fig. 4 is a fragmentary sectional side elevation thereof, on an enlarged scale, on line 4—4, Fig. 5.

Fig. 5 is a fragmentary transverse sectional elevation thereof on line 5—5, Fig. 4.

Fig. 6 is a sectional plan view thereof on line 6—6, Fig. 4.

Fig. 7 is a detached view showing the driving wheel or gear, partly in section, and the driven shaft.

Figure 1:
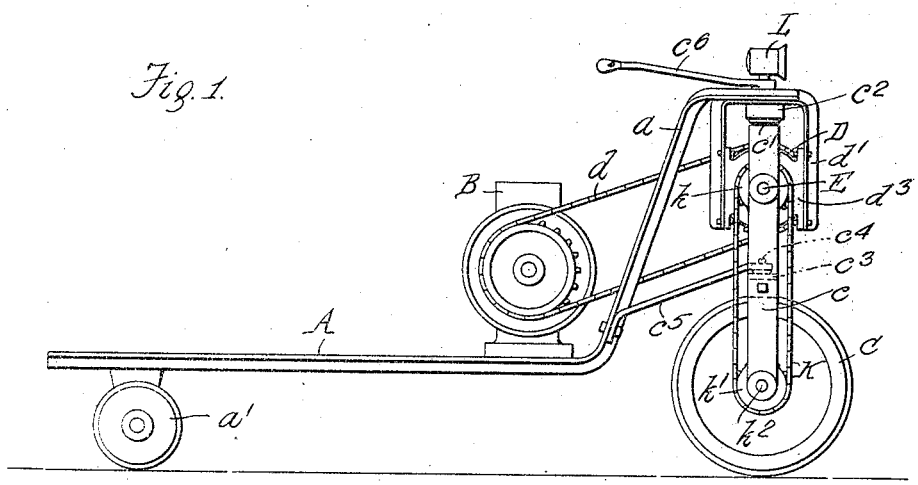
Figure 1 is a side elevation of a motor driven vehicle provided with a power transmission mechanism embodying the invention.
Figure 2:
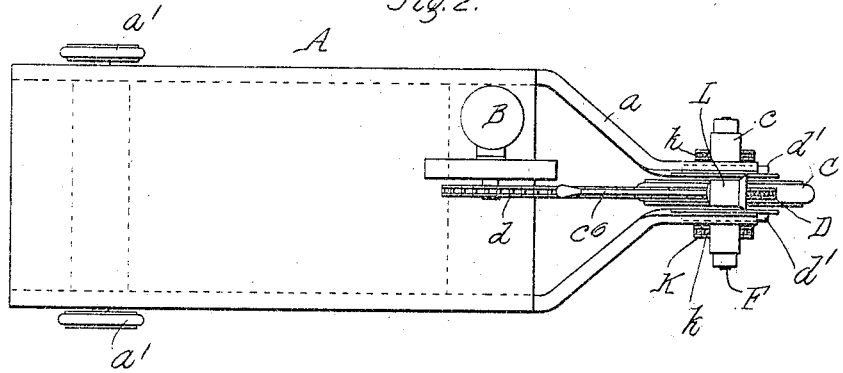
Fig. 2 is a top plan view thereof.
Figure 3:
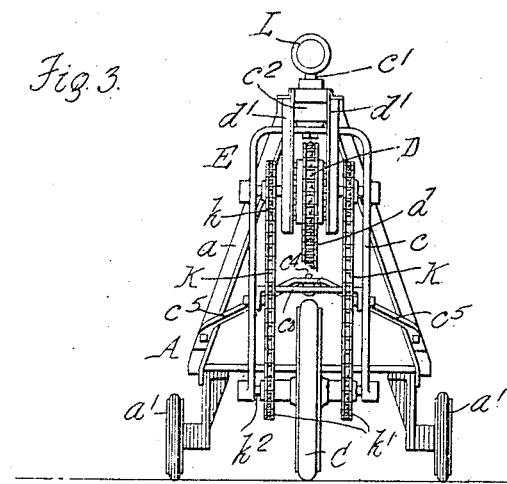
Fig. 3 is a front elevation thereof.

Figs. 8 and 9 are fragmentary sectional views of the power transmitting gear, on a larger scale, on lines 8—8 and 9—9, respectively, Fig. 7.

Fig. 10 is a fragmentary detached view of a driving pin of the power transmitting gear and a driven disk of modified construction.

The accompanying drawings show a power transmitting mechanism embodying the invention applied to a truck having a front wheel by means of which the truck is steered and to which power is transmitted for driving the truck. The invention may, however, be applied to a vehicle of any other kind and is not limited to be used on trucks.

A represents the frame of the truck having an upwardly extending portion $a$ at its front end and having its rear end supported on two wheels $a'$. The truck may be driven by any suitable means, such as a motor B suitably mounted on the frame of the truck. C represents the front wheel of the truck by means of which the truck is steered and which is connected with the motor for propelling the truck. The front wheel is preferably journaled in a steering frame or forked member $c$ of any suitable construction which is pivotally connected with the front portion of the frame of the truck. This pivotal connection may be of any suitable kind, that shown including an upper pivotal bearing comprising a pin $c'$ rigidly secured to the upper end of the forked member $c$ and extending through a vertical bearing member $c^2$ rigidly secured to the front end $a$ of the frame of the truck, and a lower pivotal bearing for bracing the lower portion of the forked member $c$, including a bar $c^3$ connecting the sides of the forked member $c$ and pivoted at $c^4$ to arms $c^5$ extending forwardly from the frame of the truck. The fork may be turned about its pivotal connections with the frame to steer the vehicle by any suitable means, such as a handle $c^6$ which, in the construction shown, is rigidly secured to the upper portion of the pin $c'$. The steering handle may be connected to any other portion of the forked member $c$.

Power is transmitted from the motor B by means of a sprocket chain $d$ which engages with a sprocket wheel D which forms the driving member of the power transmitting mechanism. The sprocket or driving wheel D is substantially annular in shape, having a hollow central portion through which the driven shaft E of the power transmitting mechanism extends and is journaled in a fixed part of the truck frame. For this purpose the truck frame is provided at its front end with a bearing frame for the driving gear D, which, in the construction shown, comprises two members $d'$ $d'$ of substantially U-shape, preferably made of angle iron, and secured at their upper portions to the truck frame. The annular driving member D is journaled in any suitable manner, for example, by means of ball bearings $d^2$ engaging in ball races in bearing members $d^3$ secured to the bearing frame members $d'$ $d'$.

The annular driving member D of the mechanism transmits power to the shaft E by means of pins or projections F which extend inwardly from the driving gear D and which are adapted to engage with a projection on the shaft E for transmitting rotary movement from the driving member D to the shaft E, the projection in the construction shown being in the form of a disk or wheel G which is rotatably mounted in a longitudinal slot $g$ in the shaft E. The driving member D is preferably constructed in two parts, namely, an outer annular rim portion $h$ having sprocket teeth adapted to engage with the sprocket chain $d$, and an inner annular portion $h'$ having radial holes or sockets in which the pins F are arranged. The pins are preferably provided with heads $f$ arranged in enlarged portions $h^2$ of the radial holes, which prevent the pins from moving inwardly toward the center of the driving member D. The pins F are held against outward movement in the opposite direction by the outer rim portion $h$ of the driving member D. The pins are preferably rotatably mounted in the radial holes of the inner member $h'$ of the driving member so that they are free to rotate about their axes. Two diametrically oppositely arranged pairs of these pins are shown in the construction illustrated, the two pins of one pair being adapted to engage the wheel or disk G at diametrically opposite portions thereof when the driving member is rotated in one direction, and the other pair of pins being adapted to engage the disk when the driving member is rotated in the opposite direction. The two parts $h$ $h'$ of the driving member may be secured together in any suitable manner to hold the pins F in place, screws $h^3$ being shown in the construction illustrated which engage in threaded holes in the parts $h$ $h'$. Power transmitting pins of any other suitable construction may be employed if desired.

The coöperating portions of the driving pins F and the wheel or disk G are preferably so made as to give the pins the maximum contact on the wheel. This may be done as shown in Figs. 4 to 8 by making the opposite faces of the disk flat and providing the pins F with tapering inner end portions, or, as shown in Fig. 10, by beveling the outer contacting edges of the disk as shown at $i$ and providing pins I, the outer ends of which are substantially cylindrical.

By means of the construction described the forked member $c$ and the shaft E journaled therein are free to swing about their pivotal connection with the frame of the truck, and the pins F will continue to transmit power to the shaft E in all positions thereof. The shaft E may be connected with the front wheel C by any suitable means, sprocket chains K being employed in the construction shown which engage with sprocket wheels $k$ $k'$ secured respectively on the driven shaft E and a shaft $k^2$ on which the front wheel C is mounted.

The construction described has the advantage that the pins F have a rolling contact with the disk G which is also rotatable relatively to the driven shaft E, so that the friction in the mechanism is reduced to a minimum. The mechanism is so constructed that the transmission of power to the front wheel does not in any way affect the steering of the truck.

If desired, a lamp L may be secured to the upper pivot pin $c'$. The lamp will then be turned with the fork $c^6$ so that the light will always be thrown in the direction in which the truck is moving.

I claim as my invention:

1. The combination with a vehicle frame and a steering frame member pivotally mounted thereon, a rotary member journaled on the vehicle frame, a shaft extending through said rotary member and journaled in said steering member, a part on said shaft rotatable in a plane substantially parallel to the axis of said shaft, and means on said rotary member engaging said part.

2. The combination with a vehicle frame and a steering frame member pivotally mounted thereon, a rotary member journaled on the vehicle frame, a shaft extending through said rotary member and journaled in said steering member, a part on said shaft rotatable in a plane substantially parallel to the axis of said shaft, and means pivotally mounted on said rotary member and adapted to engage said part to transmit rotation from said rotary member to said shaft.

3. The combination with a vehicle frame and a steering frame member pivotally mounted thereon, an annular rotary member journaled on said vehicle frame, a shaft extending through said rotary member and journaled in said steering member a projecting part on said shaft, and parts extending inwardly from said annular member and adapted to engage said projecting part of the shaft to transmit rotation from said annular member to said shaft, said inwardly extending parts of the annular member being rotatable relatively to said member.

4. The combination with a vehicle frame and a steering frame member pivotally mounted thereon, an annular rotary member journaled on said vehicle frame, a shaft extending through said rotary member and journaled in said steering member, a disk pivotally mounted on said shaft, and parts on said annular member extending inwardly therefrom and adapted to engage said disk for transmitting rotation from said annular member to said shaft.

5. The combination with a vehicle frame and a steering frame member pivotally mounted thereon, an annular rotary member journaled on said vehicle frame, a shaft extending through said rotary member and journaled in said steering member, a disk pivotally mounted on said shaft, and parts extending inwardly from said annular member and adapted to engage said disk for transmitting rotation from said annular member to said disk, said parts being rotatably mounted on said annular member to produce a rolling contact with said disk.

6. The combination with a vehicle frame and a steering frame member pivotally mounted thereon, an annular rotary member journaled on said vehicle frame, a shaft extending through said rotary member and journaled in said steering member, a disk pivotally mounted on said shaft, and pins pivotally mounted in said annular member and projecting inwardly therefrom, said pins being adapted to engage said disk to transmit rotation from said annular member to said shaft.

7. The combination with a vehicle frame and a steering frame member pivotally mounted thereon, an annular rotary member journaled on the vehicle frame, a shaft extending through said rotary member and journaled in said steering member, and pins journaled in said annular member and adapted to engage parts of said shaft for causing said annular member to rotate said shaft whereby the pins have a rolling contact with said shaft.

8. The combination with a vehicle frame and a steering frame member pivotally mounted thereon, an annular rotary member journaled on the vehicle frame, a shaft extending through said rotary member and journaled in said steering member, said rotary member including an inner annular portion and an outer portion secured to the inner portion, and pins journaled in said inner portion and adapted to engage parts of said shaft for imparting rotation from said rotary member to said shaft, the outer ends only of said pins contacting with the inner periphery of said outer portion to hold the pins against outward movement.

Witness my hand, this 9th day of October, 1917.

LOUIS KULMA.

Witnesses:
 FELIX E. PROCHNOW,
 A. L. McGEE.